Inventors
William B. Plummer
Vanderveer Voorhees
By Bruce K. Brown Atty.

Patented Feb. 12, 1935

1,991,354

UNITED STATES PATENT OFFICE 1,991,354

POLYMERIZATION OF OLEFINES

William B. Plummer, Chicago, Ill., and Vanderveer Voorhees, Hammond, Ind., assignors to Standard Oil Company, Chicago, Ill., a corporation of Indiana Application November 25, 1931, Serial No. 577,232

5 Claims. (Cl. 196—10)

This invention relates to polymerizing gaseous olefines to low boiling liquid products of motor fuel type, and more particularly to a method of obtaining high conversion rates and high yields in a given reaction system on a commercial scale. The exothermic character of the reactions involved makes it unwise to use high temperatures on account of the fact that at these temperatures the reaction tends to overheat dangerously. Furthermore, due to the rapid initial formation of conversion products the concentration of reacting gases decreases rapidly, and the rate of conversion falls off very rapidly after the initial period of the reaction. Both of these difficulties are avoided by our present invention in the manner hereinafter described.

The principal feature of our improved process consists in conducting the operation in stages with partial cooling between each stage. By this means we avoid the possibility of the reaction overheating as a result of exothermic heat evolution. Furthermore, it is possible to combine the partial cooler with a separator in such fashion that a considerable proportion of the liquid conversion products formed up to that point are removed before the reaction mixture is returned to the system. Since the reactions involved are exothermic in character, this multi-stage operation with partial cooling between stages can be carried out without appreciably increasing the heat requirements for the operation. Complete cooling and separation of unconverted gases for re-treatment leads to thermal inefficiency so great as to make the process disadvantageous commercially. Under the existing high pressures used in our process we now have found that satisfactory results can be obtained by relatively slight cooling, for example to 400 or 500° F., without loss of efficiency. As will be seen from the later complete description of our process, we may also add a small amount of high boiling liquid oil from any convenient source during the intermediate cooling and separation step, whereby the proportion of liquid products removed is materially increased.

Figure 1:
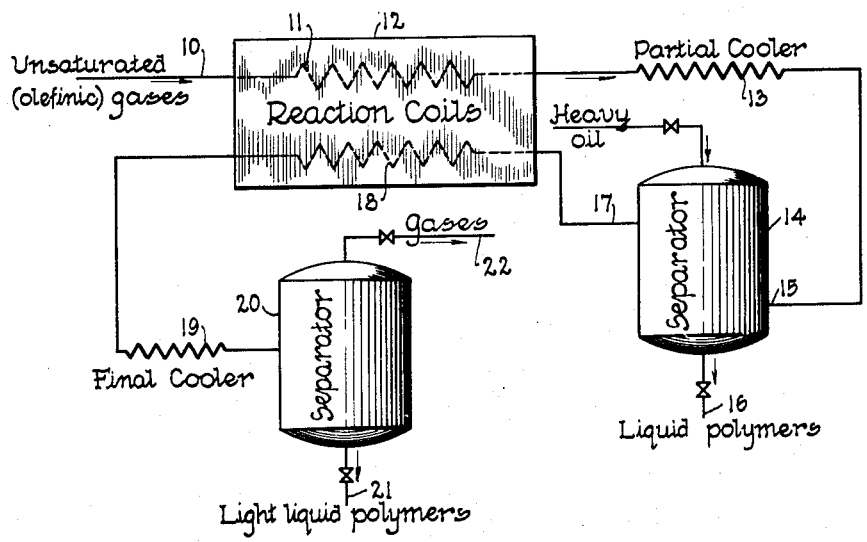
Figure 2:
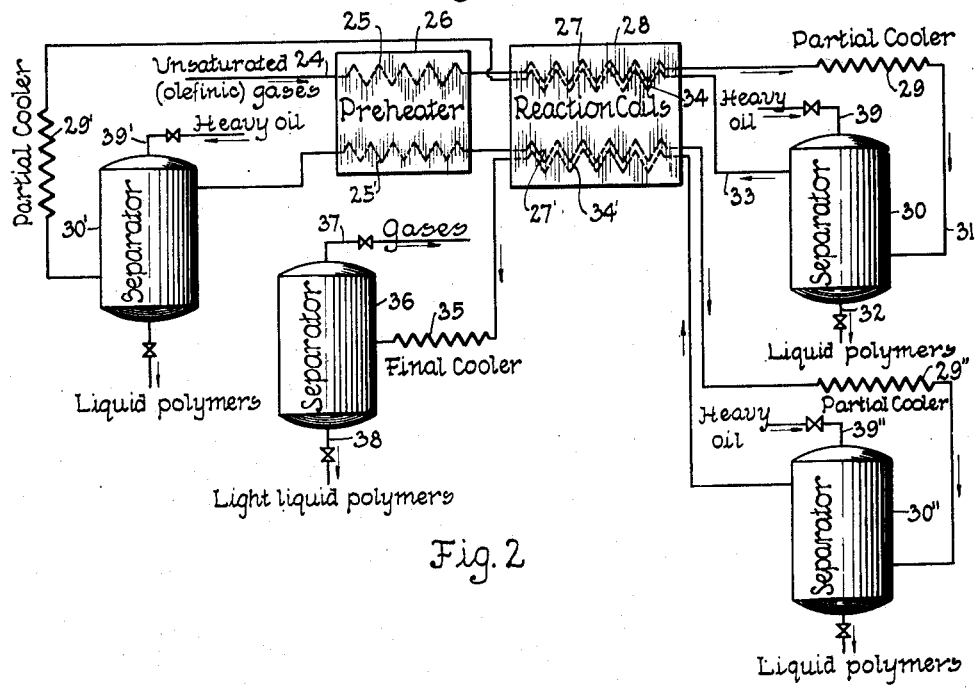

The general character of our invention will be evident from the foregoing brief description, while its scope and method of operation may be more fully understood from the following complete description and from the attached drawing, wherein Figure 1 represents diagrammatically the simplest arrangement of our process, while Figure 2 shows a modification wherein added provision is made for controlling the temperature of the reaction.

In our process we may use unsaturated gases from any convenient source, the only requirement being that they contain a high proportion of the gaseous olefines,—ethylene, propylene, and/or butylene.

Referring to Figure 1, unsaturated gases compressed to 500–3000 lbs./sq. in. are introduced through line 10 into heating and reaction coils 11 located in furnace 12 wherein the gases are heated to 700–1200° F. for a period of about 4–40 minutes, the time depending on the temperature, pressure, etc. Following this step the reaction mixture is partially cooled in cooler 13, preferably to a temperature of about 300°–500° F., after which it enters separator 14 at a low point 15. Condensed liquids are removed by offtake 16 and the uncondensed gases and vapors are returned through pipe 17 to heating and reaction coil 18 in furnace 12 which is essentially identical with the coil 11 of the previous step. The final products are completely cooled in cooler 19, and introduced into separator 20 at an intermediate point, liquid products being removed at 21 and uncondensed gases at 22.

The particular temperature to which the reaction mixture is cooled by intermediate cooler 13 cannot be specified within narrow limits, since it depends on the character of the original gases, the temperature, pressure and time of contact in coil 11, and further depends on the nature of the liquid products desired. The temperature of the materials leaving intermediate cooler 13 may, however, be defined as being sufficiently low under given conditions, to produce appreciable separation of liquid products in separator 14. A temperature between 300 and 400° F. has been found satisfactory. By introducing an absorber oil into separator 14, we find it is possible to operate the separator at a somewhat higher temperature and achieve the condensation and separation of liquid products by dissolving them in the high boiling absorber oil. When operating in this manner we may employ baffles in separator 14 to improve the contact between absorber oil and gases.

The rich oil withdrawn through line 16 may be flashed in a separator to remove the vapors and gases, and said vapors and gases may be fractionated in a suitable column by means of suitable bubble plates, reflux means, reboilers, etc. These features form no part of our present invention and they will not be described in detail. It is obvious, however, that there will be a certain amount of uncondensed gas discharged from the column, and we want to bring out the fact that this gas may be compressed and introduced with the feed stock through line 10.

It will be understood that Figure 1 is diagrammatic only, and that various modifications thereof are possible within the scope of the invention. For example, it will be evident that separator 14 may be in the form of a bubble tower with cooler 13 located therein. It will also be evident that cooler 19 may be combined with heat interchange means for products entering the coils 11 and 18 through lines 10 and 17. Furthermore, although we have shown only two stages, it will be clear that the process can be carried out in any number of stages.

In Figure 2 we have illustrated another possible arrangement of apparatus for carrying out our improved process. Compressed unsaturated gases from line 24 pass through preheating coils 25 in preheater 26 and thence into reaction coils 27 in reaction chamber 28. This section (27—28) of the apparatus is not subjected to external heating. Following reaction coils 27 the gases and products pass through partial cooler 29, entering separator 30 through line 31. Condensed products are removed by offtake 32, and the residual gases and vapors pass by pipe 33 into reaction coil 34. The reaction coil 34 is arranged in countercurrent heat interchange relation with reaction coil 27 whereby the heat abstracted by cooler 29 is compensated by exothermic heat developed in coil 27. Leaving reaction coil 34 the products and gases pass to cooler 29', separator 30', etc., this part of the system duplicating the correspondingly numbered cooling and separating system 29—33. The uncondensed gases and vapors from 30' are reheated in coil 25' and are passed once more through a reaction system to a third partial cooler 29 and separator 30, and countercurrently and in heat interchange relation back through the reaction system, the function of all parts shown being identical with the correspondingly numbered parts of the first step. It will be understood that whereas reaction sections 27—34 and 27'—34' have been referred to as coils in a non-heated chamber 28, various equivalent devices might be used. For example, sections 27—34 might consist of parallel alternatingly arranged chambers, or similarly arranged holes in a billet of metal. Leaving the final reaction coil 34' the gases are cooled completely in cooler 35, passed into separator 36, unconverted gases are removed at 37 and liquid products removed at 38.

As in the modification illustrated by Figure 1, we may inject heavy oil in small amounts into any or all of the separators 30, 30' and 30" through pipes 39, 39' and 39". The only requirements to be placed on the oil, if used, are that it be sufficiently high boiling so that no essential proportion is vaporized at the temperature of the separator, and that it shall have a high solvent power for the low boiling liquid reaction products.

It is obviously possible to arrange the apparatus for the process of Figure 2 so as to give two, four, or six (or any even multiple of 2) countercurrent passes through the reaction system with partial cooling and separation of products between each pass.

While the foregoing is a full and complete description of our invention it is understood that we are not limited thereto except as defined in the following claims, which should be construed as broadly as the prior art will permit.

We claim:

1. A process for polymerizing unsaturated gases to low boiling liquids, comprising a plurality of successive series of steps wherein each series of steps comprises passing the gas through a reaction zone maintained at 500–3000 pounds per square inch and between 700 and 1200° F., partially cooling gases and vapors leaving the reaction zone, separating condensed liquid products, removing said condensed products, reheating and returning uncondensed gases and vapors to the next series of steps, preheating the gases prior to the first and other alternately successive reaction steps, carrying out the second and other alternately successive reaction steps in indirect countercurrent heat interchange relation with the preceding reaction step, completely cooling gases and vapors following the last series of steps, and recovering liquid products.

2. A process for polymerizing unsaturated gases to low boiling liquids comprising a plurality of successive series of steps wherein each series of steps comprises passing the gases through a reaction zone maintained at 500–3000 pounds per square inch and between 700 and 1200° F., partially cooling gases and vapors leaving the reaction zone to not less than 300° F., separating condensed liquid products, removing said condensed products, and reheating and returning uncondensed gases and vapors to the next series of steps, preheating the gases prior to the first and other alternately successive reaction steps, carrying out the second and other alternately successive reaction steps in indirect countercurrent heat interchange relation with the preceding reaction step, completely cooling gases and vapors following the last series of steps, and recovering liquid products.

3. A process for polymerizing unsaturated gases to low boiling liquids, comprising a plurality of successive series of steps wherein each series of steps comprises passing the gases through a reaction zone maintained at 500–3000 pounds per square inch and between 700 and 1200° F., partially cooling gases and vapors leaving the reaction zone to not less than 400° F., introducing said partially cooled gases and vapors into a separator, introducing a relatively small amount of heavy oil in direct contact with said partially cooled gases and vapors, said oil being at least as cool as said partially cooled gases and vapors, separating and removing said oil together with condensed and dissolved products, and reheating and returning uncondensed gases and vapors to the next series of steps, preheating the gases prior to the first and other alternately successive reaction steps, carrying out the second and other alternately successive reaction steps in indirect countercurrent heat interchange relation with the preceding reaction step, completely cooling gases and vapors following the last series of steps, and recovering liquid products.

4. A process for polymerizing unsaturated gases to low boiling liquids comprising a plurality of successive series of steps wherein each series of steps comprises passing the gases through a reaction zone maintained at 500–3000 pounds per square inch and between 700–1200° F., partially cooling gases and vapors leaving the reaction zone, separating condensed liquid products, and returning uncondensed gases and vapors to the next series of steps in indirect heat interchange relation with another reaction step, completely cooling gases and vapors following the last series of steps and recovering liquid products.

5. A process for polymerizing unsaturated gases to low boiling liquids comprising a plurality of successive series of steps wherein each series of steps comprises passing the gases through a reaction zone maintained at 500–3000 pounds per square inch and between 700–1200° F., partially cooling gases and vapors leaving the reaction zone, separating condensed liquid products, and returning uncondensed gases and vapors to the next series of steps while reheating same by exothermic heat liberated in another reaction step, completely cooling gases and vapors following the last series of steps and recovering liquid products.

WILLIAM B. PLUMMER.
VANDERVEER VOORHEES.